United States Patent
Letts et al.

(10) Patent No.: US 12,305,385 B2
(45) Date of Patent: May 20, 2025

(54) PROCESS FOR ENCAPSULATING FRAGILE INSULATION MATERIALS WITHIN POLYISOCYANURATE

(71) Applicant: Firestone Building Products Company, LLC, Nashville, TN (US)

(72) Inventors: John B Letts, Carmel, IN (US); Michael J. Hubbard, Murfreesboro, TN (US)

(73) Assignee: Holcim Technology Ltd, Zug (CH)

( * ) Notice: Subject to any disclaimer, the term of this patent is extended or adjusted under 35 U.S.C. 154(b) by 1167 days.

(21) Appl. No.: 16/811,073

(22) Filed: Mar. 6, 2020

(65) Prior Publication Data

US 2020/0206988 A1    Jul. 2, 2020

Related U.S. Application Data

(63) Continuation of application No. 15/300,885, filed as application No. PCT/US2015/023532 on Mar. 31, 2015, now Pat. No. 10,611,066.

(60) Provisional application No. 61/972,737, filed on Mar. 31, 2014.

(51) Int. Cl.
| | |
|---|---|
| *E04B 1/80* | (2006.01) |
| *B29C 44/12* | (2006.01) |
| *B29C 65/48* | (2006.01) |
| *B29K 75/00* | (2006.01) |
| *B29K 79/00* | (2006.01) |
| *B29K 105/04* | (2006.01) |
| *B29L 7/00* | (2006.01) |

(Continued)

(52) U.S. Cl.
CPC .......... *E04B 1/803* (2013.01); *B29C 44/1271* (2013.01); *B29C 65/48* (2013.01); *B29C 44/1228* (2013.01); *B29K 2075/00* (2013.01); *B29K 2079/00* (2013.01); *B29K 2105/04* (2013.01); *B29K 2995/0015* (2013.01); *B29L 2007/002* (2013.01); *B29L 2009/00* (2013.01); *B29L 2031/10* (2013.01); *Y02A 30/24* (2018.01); *Y02A 30/242* (2018.01); *Y02B 80/10* (2013.01)

(58) Field of Classification Search
None
See application file for complete search history.

(56) References Cited

U.S. PATENT DOCUMENTS

| | | |
|---|---|---|
| 4,291,129 A | 9/1981 | Kennedy |
| 5,989,371 A | 11/1999 | Nishimoto |
| 6,860,082 B1 | 3/2005 | Yamamoto et al. |

(Continued)

FOREIGN PATENT DOCUMENTS

| | | |
|---|---|---|
| JP | H01-263041 A | 10/1989 |
| JP | H10 219866 A | 8/1998 |

(Continued)

OTHER PUBLICATIONS

International Search Report for related PCT/US2015/023532 dated Jun. 25, 2015.

*Primary Examiner* — Chinessa T. Golden
(74) *Attorney, Agent, or Firm* — Renner, Kenner; Arthur M. Reginelli

(57) ABSTRACT

Embodiments of the present invention are based, at least in part, on the discovery of methods for encapsulating fragile insulation materials within polyisocyanurate foam to thereby provide a construction board having an advantageous balance of insulating properties and mechanical durability.

8 Claims, 5 Drawing Sheets

(51) Int. Cl.
 *B29L 9/00* (2006.01)
 *B29L 31/10* (2006.01)

(56) References Cited

U.S. PATENT DOCUMENTS

| | | | |
|---|---|---|---|
| 2006/0127664 A1 | 6/2006 | Geary et al. | |
| 2010/0031603 A1* | 2/2010 | Letts | B32B 27/40 |
| | | | 52/309.1 |
| 2010/0136318 A1 | 6/2010 | Letts et al. | |
| 2013/0164524 A1* | 6/2013 | Letts | E04C 2/24 |
| | | | 428/319.3 |
| 2013/0089696 A1 | 11/2013 | Pargeter et al. | |

FOREIGN PATENT DOCUMENTS

| | | |
|---|---|---|
| JP | 2000-248653 A | 9/2000 |
| JP | 2000 356296 A | 12/2000 |
| JP | 2004 017424 A | 1/2004 |
| JP | 2005 161794 A | 6/2005 |
| JP | 2007-100732 A | 4/2007 |

\* cited by examiner

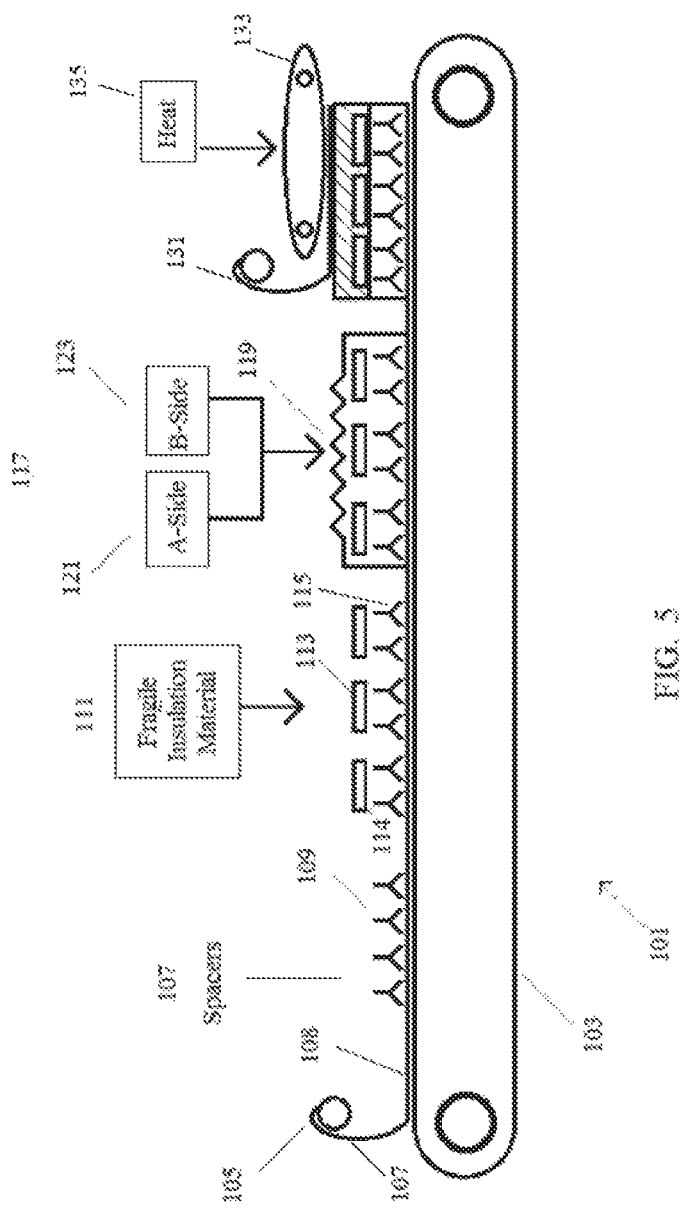

PROCESS FOR ENCAPSULATING FRAGILE INSULATION MATERIALS WITHIN POLYISOCYANURATE

This application is a Continuation Application of U.S. Non-Provisional application Ser. No. 15/300,885 filed on Sep. 30, 2016, which is a National-Stage application of PCT/US2015/023532 filed on Mar. 31, 2015, which claims the benefit of U.S. Provisional Application Ser. No. 61/972,737 filed on Mar. 31, 2014, which are incorporated herein by reference.

FIELD OF THE INVENTION

Embodiments of the present invention are directed toward processes for encapsulating fragile insulation materials within polyurethane or polyisocyanurate foam. Embodiments of the present invention advantageously take advantage of continuous processing techniques.

BACKGROUND OF THE INVENTION

Fragile insulation materials are known in the art and include materials such as vacuum insulation panels. While these materials provide advantageous insulating properties, they often have weak mechanical attributes. For example, fragile insulation materials, such as vacuum insulation panels, are often manufactured from very friable materials, such as fumed silica, aerogel, perlite, or glass. As a result, these materials are susceptible to mechanical damage during use. Additionally, vacuum insulation panels rely on gas-tight enclosures to ensure proper vacuum, which provides the insulating capability to the material. Where this enclosure is compromised, such as through puncture, the insulating capabilities of the material are diminished or lost.

Attempts have been made at providing composites wherein fragile insulation materials (e.g., VIPs) are provided within a composite. For example, WO2006/134581 proposes an insulating panel wherein a VIP is embedded into a foam during manufacture of the panel. This manufacturing process includes the laying down of a first foam layer, followed by the positioning of a VIP onto the foam, and then the second laying down of foam over the VIP.

Methods, such as those proposed by WO2006/134581, suffer from apparent problems associated with the ability to properly position the VIP onto the foam layer. Efforts to solve these problems are shown in U.S. Publication No. 2013/0089696, wherein VIPs are adhesively secured to a facer material prior to the application of the foam material. The use of the adhesive enables accurate and stable positioning of the VIPs during the manufacturing process. This accurate positioning allows minimal gaps between the VIPs thereby reducing edge losses and allowing better tolerance for cutting final panel sizes.

While adhesively securing the VIPs to a facer may provide advantage with respect to the accurate and stable positioning of the VIP, a problem remains in that the VIP is not completely encased within, and therefore not completely protected by, the foam layer.

Since fragile insulation materials, such as vacuum insulation panels, offer advantageous insulating properties, their use as insulating materials within the construction industry would be highly advantageous. This usefulness, however, is contingent upon the ability to protect these materials from various mechanical forces. Moreover, the successful use of these boards within the construction industry will be contingent on the ability to develop continuous manufacturing processes that can efficiently and cost effectively produce commercial product.

BRIEF DESCRIPTION OF THE DRAWINGS

FIG. 5 is a schematical representation of a process according to embodiments of the present invention.

SUMMARY OF THE INVENTION

Figure 1:
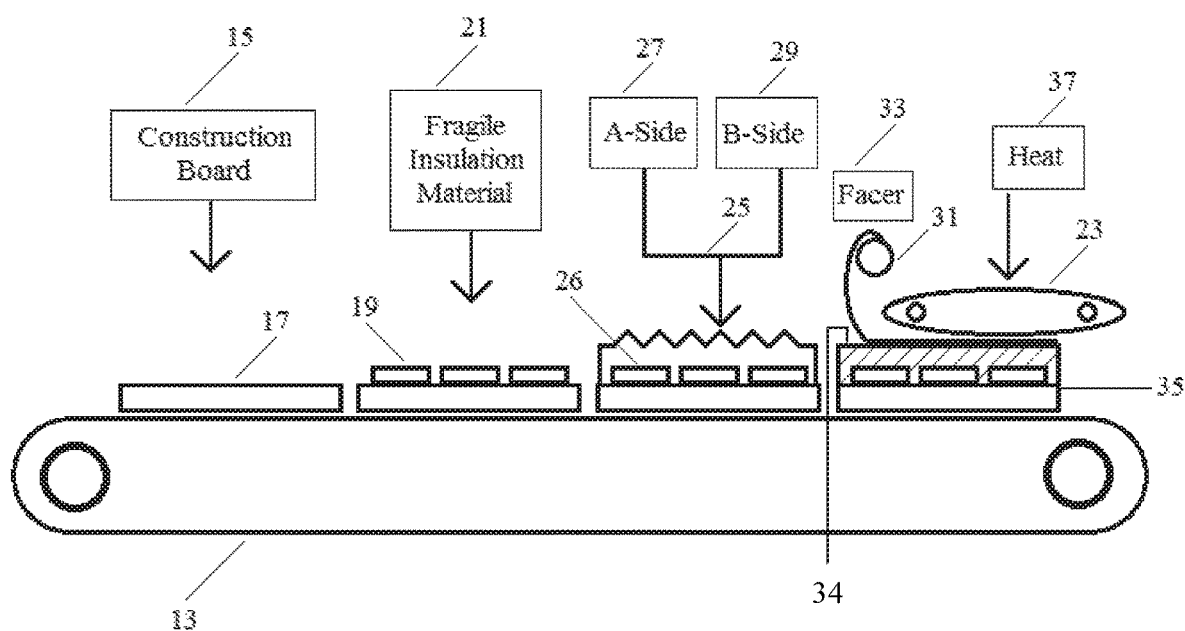
FIG. 1 is a schematical representation of a process according to embodiments of the present invention.

One or more embodiments of the present invention provides a process for encapsulating fragile insulation materials, the process comprising providing a preformed construction board, positioning one or more fragile insulation materials on the board, and depositing a developing foam over the fragile insulation materials to at least partially cover the fragile insulation materials and at least partially mate the developing foam with the construction board One or more embodiments of the present invention provides a process for encapsulating fragile insulation materials, the process comprising, providing a facer material, depositing a developing foam on to the facer material, positioning one or more fragile insulation materials on to the developing foam, depositing additional developing foam over the fragile insulation materials to at least partially cover the fragile insulation materials and mate with the previously deposited developing foam.

One or more embodiments of the present invention provides a process for encapsulating fragile insulation materials, the process comprising, providing a facer material, positioning one or more spacers on the facer material, positioning one or more fragile insulation materials on to the spacers, depositing a developing foam on to the fragile insulation materials and the facer.

DETAILED DESCRIPTION OF ILLUSTRATIVE EMBODIMENTS

Embodiments of the present invention are based, at least in part, on the discovery of methods for encapsulating fragile insulation materials within polyisocyanurate foam to thereby provide a construction board having an advantageous balance of insulating properties and mechanical durability. According to one or more of the embodiments of this invention, encapsulation of the fragile insulation material takes place by depositing a developing foam of polyurethane or polyisocyanurate on one or more surfaces of a fragile insulation material to provide a composite wherein the fragile insulation material is completely encapsulated by the foam. These methods advantageously employ conventional equipment that is used for producing polyurethane or polyisocyanurate construction board, such as conventional foam applicators and laminator systems.

Fragile Insulation Materials

Practice of the present invention is not necessarily limited by the selection of the fragile insulation material that is encapsulated by the processes described herein. In one or more embodiments, the fragile insulation materials offer greater insulating properties than the polyurethane or polyisocyanurate foams that encase them. In one or more embodiments, the fragile insulation materials have a lower thermal conductivity than the polyurethane or polyisocyanurate foams that encase them. In one or more embodiments, the fragile insulation materials include a friable component.

In one or more embodiments, the fragile insulation materials are or include cellular or open cell structures wherein the cellular walls of the cellular structure include one or more of silica (e.g., fumed or precipitated silica), alumina, titania, magnesia, chromia, tin dioxide, glass wool, fiberglass, and carbon. In one or more embodiments, the cellular structure my include aluminosilicates such as, but not limited to, perlite.

In one or more embodiments, the fragile insulation material may include an aerogel. Specific examples include carbon aerogels, silica aerogels, and alumina aerogels.

In one or more embodiments, the fragile insulation material includes a vacuum insulation panel (VIP). Vacuum insulation panels are known and generally include substantially gas-tight enclosures surrounding a rigid core wherein air therein has been evacuated. The enclosures may include membrane walls that prevent air from entering the panel. The core may include a rigid, highly-porous material that supports the membrane walls against atmospheric pressure once the air is evacuated.

Examples of vacuum insulation panels include those that include a cellular core that may include silica (e.g., fumed or precipitated silica), alumina, titania, magnesia, chromia, tin dioxide, glass wool, fiberglass, carbon, aluminosilicates (e.g., perlite), open-cell polystyrene, or open cell polyurethane. In these or other embodiments, the core may include an aerogel such as carbon aerogels, silica aerogels, and alumina aerogels.

Some specific examples of vacuum insulation panels are also described in U.S. Pat. Publ. Nos. 2013/0216854, 2013/0216791, 2013/0142972, 2013/0139948, 2012/0009376, 2009/0126600, 2008/0236052, 2004/0058119, 2003/0159404, and 2003/0082357 which are incorporated herein by reference.

Other thermal insulation products include those that can be employed as the fragile insulation materials within this invention include modified atmospheric insulation (MAI) panels. Devices of this nature, and methods for their manufacture, are disclosed in U.S. Publication Nos. 2014/0360044 and 2014/0366480, which are incorporated herein by reference.

Developing Foam

Throughout this specification, reference may be made to a developing foam. This term is used with the understanding that polyurethane and polyisocyanurate foams (which terms may generally be used interchangeably herein as described below) are formed by mixing a first stream that includes an isocyanate-containing compound with a second stream that includes an isocyanate-reactive compound. Using conventional terminology, the first stream (i.e., the stream including an isocyanate-containing compound) may be referred to as an A-side stream, an A-side reactant stream, or simply an A stream. Likewise, the second stream (i.e., the stream including an isocyanate-reactive compound) may be referred to as a B-side stream, B-side reactant stream, or simply B stream. In any event, the reaction that ensues produces a foam that, according to one or more kinetic and/or thermodynamic properties, develops over a period of time. Unless otherwise specified, therefore, the term developing foam will be understood to refer to the mixture of the polyurethane and/or polyisocyanurate reactants as they exist prior to cure, which when the reaction mixture is appreciably immobile (e.g. is no longer flowable).

In one or more embodiments, either stream may carry additional ingredients including, but not limited to, flame-retardants, surfactants, blowing agents, catalysts, emulsifiers/solubilizers, fillers, fungicides, anti-static substances, and mixtures of two or more thereof.

A-Side Stream

In one or more embodiments, the A-side stream may only contain the isocyanate-containing compound. In one or more embodiments, multiple isocyanate-containing compounds may be included in the A-side. In other embodiments, the A-side stream may also contain other constituents such as, but not limited to, flame-retardants, surfactants, blowing agents and other non-isocyanate-reactive components. In one or more embodiments, the complementary constituents added to the A-side are non-isocyanate reactive.

Suitable isocyanate-containing compounds useful for the manufacture of polyisocyanurate construction board are generally known in the art and embodiments of this invention are not limited by the selection of any particular isocyanate-containing compound. Useful isocyanate-containing compounds include polyisocyanates. Useful polyisocyanates include aromatic polyisocyanates such as diphenyl methane diisocyanate in the form of its 2,4'-, 2,2'-, and 4,4'-isomers and mixtures thereof. The mixtures of diphenyl methane diisocyanates (MDI) and oligomers thereof may be referred to as "crude" or polymeric MDI, and these polyisocyanates may have an isocyanate functionality of greater than 2. Other examples include toluene diisocyanate in the form of its 2,4' and 2,6'-isomers and mixtures thereof, 1,5-naphthalene diisocyanate, and 1,4' diisocyanatobenzene. Exemplary polyisocyanate compounds include polymeric Rubinate 1850 (Huntsmen Polyurethanes), polymeric Lupranate M70R (BASF), and polymeric Mondur 489N (Bayer).

B-Side Stream

In one or more embodiments, the B-side stream may only include the isocyanate-reactive compound. In one or more embodiments, multiple isocyanate-reactive compounds may be included in the B-side. In other embodiments, the B-side stream may also contain other constituents such as, but not limited to, flame-retardants, surfactants, blowing agents and other non-isocyanate-containing components. In particular embodiments, the B-side includes an isocyanate reactive compound and a blowing agent. In these or other embodiments, the B-side may also include flame retardants, catalysts, emulsifiers/solubilizers, surfactants, fillers, fungicides, anti-static substances, water and other ingredients that are conventional in the art.

An exemplary isocyanate-reactive compound is a polyol. The term polyol, or polyol compound, includes diols, polyols, and glycols, which may contain water as generally known in the art. Primary and secondary amines are suitable, as are polyether polyols and polyester polyols. Useful polyester polyols include phthalic anhydride based PS-2352 (Stepen), phthalic anhydride based polyol PS-2412 (Stepen), teraphthalic based polyol 3522 (Kosa), and a blended polyol TR 564 (Oxid). Useful polyether polyols include those based on sucrose, glycerin, and toluene diamine. Examples of glycols include diethylene glycol, dipropylene glycol, and ethylene glycol. Suitable primary and secondary amines include, without limitation, ethylene diamine, and diethanolamine. In one or more embodiments, a polyester polyol is employed. In one or more embodiments, the present invention may be practiced in the appreciable absence of any polyether polyol. In certain embodiments, the ingredients are devoid of polyether polyols.

Catalysts

Catalysts, which are believed to initiate the polymerization reaction between the isocyanate and the polyol, as well as a trimerization reaction between free isocyanate groups when polyisocyanurate foam is desired, may be employed. While some catalysts expedite both reactions, two or more catalysts may be employed to achieve both reactions. Useful catalysts include salts of alkali metals and carboxylic acids or phenols, such as, for example potassium octoate; mononuclear or polynuclear Mannich bases of condensable phenols, oxo-compounds, and secondary amines, which are optionally substituted with alkyl groups, aryl groups, or aralkyl groups; tertiary amines, such as pentamethyldiethylene triamine (PMDETA), 2,4,6-tris [(dimethylamino)methyl]phenol, triethyl amine, tributyl amine, N-methyl morpholine, and N-ethyl morpholine; basic nitrogen compounds, such as tetra alkyl ammonium hydroxides, alkali metal hydroxides, alkali metal phenolates, and alkali metal acholates; and organic metal compounds, such as tin(II)-salts of carboxylic acids, tin(IV)-compounds, and organo lead compounds, such as lead naphthenate and lead octoate.

Surfactants, Emulsifiers and Solubilizers

Surfactants, emulsifiers, and/or solubilizers may also be employed in the production of polyurethane and polyisocyanurate foams in order to increase the compatibility of the blowing agents with the isocyanate and polyol components. Surfactants may serve two purposes. First, they may help to emulsify/solubilize all the components so that they react completely. Second, they may promote cell nucleation and cell stabilization.

Exemplary surfactants include silicone co-polymers or organic polymers bonded to a silicone polymer. Although surfactants can serve both functions, it may also be useful to ensure emulsification/solubilization by using enough emulsifiers/solubilizers to maintain emulsification/solubilization and a minimal amount of the surfactant to obtain good cell nucleation and cell stabilization. Examples of surfactants include Pelron surfactant 9920, Goldschmidt surfactant B8522, and GE 6912. U.S. Pat. Nos. 5,686,499 and 5,837,742 are incorporated herein by reference to show various useful surfactants.

Suitable emulsifiers/solubilizers include DABCO Ketene 20AS (Air Products), and Tergitol NP-9 (nonylphenol+9 moles ethylene oxide).

Flame Retardants

Flame Retardants may be used in the production of polyurethane and polyisocyanurate foams, especially when the foams contain flammable blowing agents such as pentane isomers. Useful flame retardants include tri(monochloropropyl) phosphate (a.k.a. tris (cloro-propyl) phosphate), tri-2-chloroethyl phosphate (a.k.a tris(chloro-ethyl) phosphate), phosphonic acid, methyl ester, dimethyl ester, and diethyl ester. U.S. Pat. No. 5,182,309 is incorporated herein by reference to show useful blowing agents.

Blowing Agents

Useful blowing agents include isopentane, n-pentane, cyclopentane, alkanes, (cyclo) alkanes, hydrofluorocarbons, hydrochlorofluorocarbons, fluorocarbons, fluorinated ethers, alkenes, alkynes, carbon dioxide, hydrofluoroolefins (HFOs) and noble gases.

Amount of Reactants

An isocyanurate is a trimeric reaction product of three isocyanates forming a six-membered ring. The ratio of the equivalence of NCO groups (provided by the isocyanate-containing compound or A-side) to isocyanate-reactive groups (provided by the isocyanate-containing compound or B side) may be referred to as the index or ISO index. When the NCO equivalence to the isocyanate-reactive group equivalence is equal, then the index is 1.00, which is referred to as an index of 100, and the mixture is said to be stoiciometrically equal. As the ratio of NCO equivalence to isocyanate-reactive groups equivalence increases, the index increases. Above an index of about 150, the material is generally known as a polyisocyanurate foam, even though there are still many polyurethane linkages that may not be trimerized. When the index is below about 150, the foam is generally known as a polyurethane foam even though there may be some isocyanurate linkages. For purposes of this specification, reference to polyisocyanurate and polyurethane will be used interchangeably unless a specific ISO index is referenced.

In one or more embodiments, the concentration of the isocyanate-containing compound to the isocyanate-reactive compounds within the respective A-side and B-side streams is adjusted to provide the foam product with an ISO index of at least 150, in other embodiments at least 170, in other embodiments at least 190, in other embodiments at least 210, in other embodiments at least 220, and in other embodiments at least 250. In these or other embodiments, the concentration of the isocyanate-containing compound to the isocyanate-reactive compounds within the respective A-side and B-side streams is adjusted to provide the foam product with an ISO index of at most 400, in other embodiments at most 350, and in other embodiments at most 300. In one or more embodiments, the concentration of the isocyanate-containing compound to the isocyanate-reactive compounds within the respective A-side and B-side streams is adjusted to provide the foam product with an ISO index of from about 150 to about 400, in other embodiments from about 170 to about 350, and in other embodiments from about 190 to about 330, and in other embodiments from about 220 to about 280.

In one or more embodiments, where an alkane blowing agent is employed, the amount of alkane blowing agent (e.g., pentanes) used in the manufacture of polyisocyanurate foam construction board according to the present invention may be described with reference to the amount of isocyanate-reactive compound employed (e.g. polyol). For example, in one or more embodiments, at least 12, in other embodiments at least 14, and in other embodiments at least 18 parts by weight alkane blowing agent per 100 parts by weight of polyol may be used. In these or other embodiments, at most 40, in other embodiments at most 36, and in other embodiments at most 33 parts by weight alkane blowing agent per 100 parts by weight of polyol may be used. In one or more embodiments, from about 12 to about 40, in other embodiments from about 14 to about 36, and in other embodiments from about 18 to about 33 of alkane blowing agent per 100 parts by weight of polyol may be used.

In one or more embodiments, where an hydrofluoroolefin blowing agent is employed, the amount of hydrofluoroolefin blowing agent used in the manufacture of polyisocyanurate foam construction board according to the present invention may be described with reference to the amount of isocyanate-reactive compound employed (e.g. polyol). For example, in one or more embodiments, at least 15, in other embodiments at least 18, and in other embodiments at least 20 parts by weight hydrofluoroolefin blowing agent per 100 parts by weight of polyol may be used. In these or other embodiments, at most 50, in other embodiments at most 45, and in other embodiments at most 40 parts by weight hydrofluoroolefin blowing agent per 100 parts by weight of polyol may be used. In one or more embodiments, from about 15 to about 50, in other embodiments from about 18 to about 45, and in other embodiments from about 20 to about 40 of hydrofluoroolefin blowing agent per 100 parts by weight of polyol may be used.

In one or more embodiments, the amount of surfactant (e.g., silicone copolymer) used in the manufacture of polyisocyanurate foam construction board according to the present invention may be described with reference to the amount of isocyanate-reactive compound employed (e.g. polyol). For example, in one or more embodiments, at least 1.0, in other embodiments at least 1.5, and in other embodiments at least 2.0 parts by weight surfactant per 100 parts by weight of polyol may be used. In these or other embodiments, at most 5.0, in other embodiments at most 4.0, and in other embodiments at most 3.0 parts by weight surfactant per 100 parts by weight of polyol may be used. In one or more embodiments, from about 1.0 to about 5.0, in other embodiments from about 1.5 to about 4.0, and in other embodiments from about 2.0 to about 3.0 of surfactant per 100 parts by weight of polyol may be used.

In one or more embodiments, the amount of flame retardant (e.g., liquid phosphates) used in the manufacture of polyisocyanurate foam construction board according to the present invention may be described with reference to the amount of isocyanate-reactive compound employed (e.g. polyol). For example, in one or more embodiments, at least 5, in other embodiments at least 10, and in other embodiments at least 12 parts by weight flame retardant per 100 parts by weight of polyol may be used. In these or other embodiments, at most 30, in other embodiments at most 25, and in other embodiments at most 20 parts by weight flame retardant per 100 parts by weight of polyol may be used. In one or more embodiments, from about 5 to about 30, in other embodiments from about 10 to about 25, and in other embodiments from about 12 to about 20 of flame retardant per 100 parts by weight of polyol may be used.

In one or more embodiments, the amount of catalyst (s) employed in practice of the present invention can be readily determined by the skilled person without undue experimentation or calculation. Indeed, the skilled person is aware of the various process parameters that will impact the amount of desired catalyst. Also, the amount of catalyst employed can be varied to achieve various desired properties such as the desired index.

Characteristics of Foam Encasement

As indicated above, the foam produced by one or more embodiments of the present invention, which foam is employed to encase the fragile insulation materials, includes a polyurethane and/or polyisocyanurate foam. As is generally understood in the art, a foam is a cellular structure that may include an interconnected network of solid struts or plates that form the edges and faces of cells. These cellular structures may, in one or more embodiments, also be defined by a "relative density" that is less than 0.8, in other embodiments less than 0.5, and in other embodiments less than 0.3. As those skilled in the art will appreciate, "relative density" refers to the density of the cellular material divided by that of the solid from which the cell walls are made. As the relative density increases, the cell walls thicken and the pore space shrinks such that at some point there is a transition from a cellular structure to one that is better defied as a solid containing isolated pores.

In one or more embodiments, the developing foam is engineered to produce a final foam structure that is characterized by a relatively low density. In one or more embodiments, this foam may have a density defined according to ASTMC 303 that is less than 2.5 pounds per cubic foot (12 kg/m$^2$), in other embodiments less than 2.0 pounds per cubic foot (9.8 kg/m$^2$), in other embodiments less than 1.9 pounds per cubic foot (9.3 kg/m$^2$), and still in other embodiments less than 1.8 pounds per cubic foot (8.8 kg/m$^2$). In one or more embodiments, foam may be characterized by having a density that is greater than 1.50 pounds per cubic foot (7.32 kg/m$^2$) and optionally greater than 1.55 pounds per cubic foot (7.57 kg/m$^2$).

In other embodiments, the developing foam is engineered to produce a final foam product having a relatively high density. In one or more embodiments, the foam has a density, as defined by ASTM C303, of greater than 2.5 pounds per cubic foot (12.2 kg/m$^2$), as determined according to ASTM C303, in other embodiments the density is greater than 2.8 pounds per cubic foot (13.7 kg/m$^2$), in other embodiments greater than 3.0 pounds per cubic foot (14.6 kg/m$^2$), and still in other embodiments greater than 3.5 pounds per cubic foot (17.1 kg/m$^2$). In one or more embodiments, the density may be less than 20 pounds per cubic foot (97.6 kg/m$^2$), in other embodiments less than 10 pounds per cubic foot (48.8 kg/m$^2$), in other embodiments less than 6 pounds per cubic foot (29.3 kg/m$^2$), in other embodiments less than 5.9 pounds per cubic foot (28.8 kg/m$^2$), in other embodiments less than 5.8 pounds per cubic foot (28.3 kg/m$^2$), in other embodiments less than 5.7 pounds per cubic foot (27.8 kg/m$^2$), in other embodiments less than 5.6 pounds per cubic foot (27.3 kg/m$^2$), and still in other embodiments less than 5.5 pounds per cubic foot (26.9 kg/m$^2$).

In one or more embodiments, the developing foam is engineered to provide a final foam product having a desired ISO index. As the skilled person understands, ISO index correlates to PIR/PUR ratio and can determined by IR spectroscopy using standard foams of known index (note that ratio of 3 PIR/PUR provides an ISO Index of 300), of at least 150, in other embodiments at least 180, in other embodiments at least 200, in other embodiments at least 220, in other embodiments at least 240, in other embodiments at least 260, 270, in other embodiments at least 285, in other embodiments at least 300, in other embodiments at least 315, and in other embodiments at least 325. In these or other embodiments, the foam may be characterized by an ISO index of less than 350, in other embodiments less than 300, in other embodiments less than 275, in other embodiments less than 250, in other embodiments less than 225, and in other embodiments less than 200.

Method of Encapsulation—First Embodiment

In one embodiment, the process of encapsulating a fragile insulation material includes providing a preformed construction board, positioning one or more fragile insulation materials on the board, and depositing a developing foam over the fragile insulation material to at least partially cover the fragile insulation material and at least partially mate the developing foam with the construction board.

Practice of one or more of these embodiments is not necessarily limited by the type of construction board employed. In one or more embodiments, the construction board is a generally solid material such as wood, particle, or fiber board. In one or more embodiments, the construction board is a wood board such as plywood, luan board, or oriented-strand board (OSB). In other embodiments, the construction board is a particle or fiber board such as masonite board, wall board, gypsum board, and variations thereof such as those boards available under the tradename DensDeck.

In other embodiments, construction board is or includes a polymeric materials. In one or more embodiments, the polymeric material is generally solid, which refers to a structure wherein the relative density is greater than 0.8, in other embodiments greater than 0.85, in other embodiments greater than 0.90, and in other embodiments greater than 0.95. In other embodiments, the polymeric material is cellular in nature, which refers to a material having a relatively density that is less than 0.8, in other embodiments less than 0.5, and in other embodiments less than 0.3. As those skilled in the art will appreciate, "relative density" refers to the density of the cellular material divided by that of the solid from which the cell walls are made. As the relative density increases, the cell walls thicken and the pore space shrinks such that at some point there is a transition from a cellular structure to one that is better defied as a solid containing isolated pores.

In one or more embodiments, the construction board is a relatively low-density polyurethane or polyisocyanurate foam board. As those skilled in the art appreciate, these foam boards may be generally characterized by a density as defined by ASTM C303 that is less than 2.5 pounds per cubic foot (12 kg/m$^2$), in other embodiments less than 2.0 pounds per cubic foot (9.8 kg/m$^2$), in other embodiments less than 1.9 pounds per cubic foot (9.3 kg/m$^2$), and still in other embodiments less than 1.8 pounds per cubic foot (8.8 kg/m$^2$). In one or more embodiments, the density is greater than 1.50 pounds per cubic foot (7.32 kg/m$^2$) and optionally greater than 1.55 pounds per cubic foot (7.57 kg/m$^2$).

In one or more embodiments, the construction board is a relatively high-density polyurethane or polyisocyanurate foam board. In one or more embodiments, these foam boards may be generally characterized by a density as defined by ASTM C300 that is greater than pounds per cubic foot (12.2 kg/m$^2$), as determined according to ASTM C303, in other embodiments the density is greater than 2.8 pounds per cubic foot (13.7 kg/m$^2$), in other embodiments greater than 3.0 pounds per cubic foot (14.6 kg/m$^2$), and still in other embodiments greater than 3.5 pounds per cubic foot (17.1 kg/m$^2$). In one or more embodiments, the density of body 11 may be less than 20 pounds per cubic foot (97.6 kg/m$^2$), in other embodiments less than 10 pounds per cubic foot (48.8 kg/m$^2$), in other embodiments less than 6 pounds per cubic foot (29.3 kg/m$^2$), in other embodiments less than 5.9 pounds per cubic foot (28.8 kg/m$^2$), in other embodiments less than 5.8 pounds per cubic foot (28.3 kg/m$^2$), in other embodiments less than 5.7 pounds per cubic foot (27.8 kg/m$^2$), in other embodiments less than 5.6 pounds per cubic foot (27.3 kg/m$^2$), and still in other embodiments less than 5.5 pounds per cubic foot (26.9 kg/m$^2$).

Regardless of density, the polyurethane or polyisocyanurate foam boards may be characterized by a thickness greater than 0.255 inches (0.65 cm), in other embodiments greater than 0.30 inches (0.76 cm), in other embodiments greater than 0.375 inches (0.95 cm), and in other embodiments greater than 0.40 inches (1.01 cm). In these or other embodiments, the thickness 20 may be from about 0.375 to 4.0 inches (0.95-10.16 cm) or in other embodiments from about 0.38 to 2.0 inches (0.97-5.08 cm) in thickness.

Figure 2:
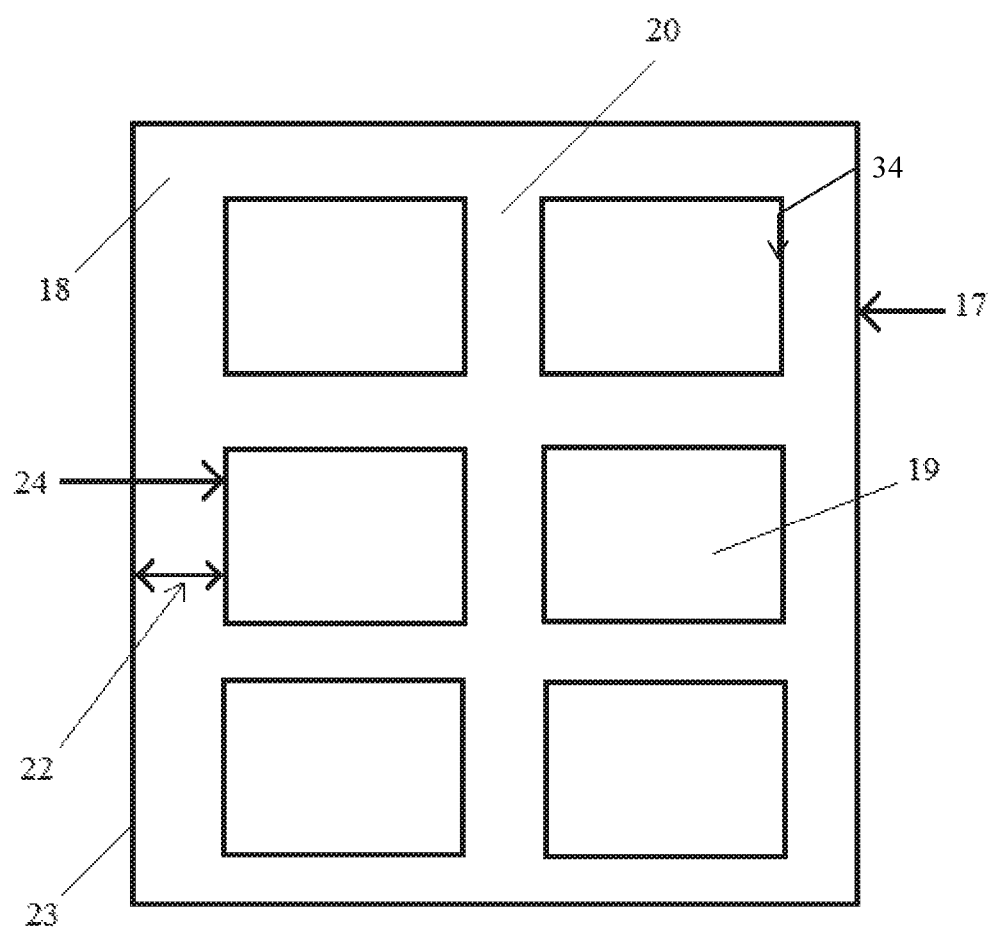
FIG. 2 is an overhead view of a pattern for placing fragile insulation materials according to embodiments of the present invention.

The process of these embodiments can be described with reference to FIG. 1, which shows continuous process 11 employing conveyor system 13. In a first step 15 of process 11, a construction board 17 is placed on conveyor system 13. Following this step 15, fragile insulation materials 19 are deposited on or applied to construction board 17 within second step 21. In one or more embodiments, fragile insulation materials 19 are adhesively mated or otherwise affixed to a top planar surface of construction board 17 through the use of an adhesive. Accordingly, the process may include the step of applying an adhesive to the fragile insulation material, to the construction board, or to both the fragile insulation material and the construction board. The adhesive may include, for example, hot melt adhesives, contact adhesives, or liquid adhesives. As generally shown in FIG. 1, and as more specifically shown in FIG. 2, fragile insulation materials 19, which may have a rectangular or square shape, are placed on an upper surface 18 of construction board 17 according to a desired pattern that provides interstices 20 between the respective fragile insulation materials 19. Additionally, fragile insulation materials 19 are placed upon upper surface 18 of construction board 17 in a manner that provides a gap 22 between the edge 23 of construction board 17 and the outer most edge 24 of fragile insulation materials 19.

In one or more embodiments, an assembly of fragile insulation materials may be fabricated in advance of the encapsulating procedures. This may facilitate placement of the fragile insulation materials in to a desired pattern. For example, in one or more embodiments, the fragile insulation materials may be adhered to a common substrate in a desired pattern prior to incorporation of the fragile insulation materials in to the procedures described herein. Various substrates may be used including woven fabrics that allow the developing foam to move therethrough. Within these embodiments, the fragile insulation materials may be adhered in a desired pattern to the fabric substrate, and then this assembly of fragile insulation materials can be employed in practicing the present invention.

In one or more embodiments, the fragile insulation materials may be adhered to the construction board in advance of the encapsulating procedures. For example, in one or more embodiments, the fragile insulation materials may be adhered to a construction board in a desired pattern prior to incorporation of the fragile insulation materials into the procedures described herein. Thus, while the embodiments described above position the fragile insulation materials onto the construction board within a continuous, integrated process, other embodiments allow for the fragile insulation materials to be positioned on the construction board within an "off-line" step that is separate and distinct from the process of depositing the foam. Various adhesives may be employed including, but not limited to, hot melt adhesives, contact adhesives, and liquid adhesives.

In one or more embodiments, the fragile insulation materials are arranged in a pattern to achieve relatively high coverage with respect to the planar surface of the finished foam composite. In one or more embodiments, the fragile insulation materials are arranged in a pattern sufficient to cover at least 60%, in other embodiments at least 70%, in other embodiments at least 75%, and in other embodiments at least 80% of the surface area of the final foam composite, where the surface area is taken on a plane of the final product that passes through the insulating materials. In one or more embodiments, while increased coverage is desirable, the pattern may desirably provide for sufficient interstices between the respective fragile insulation materials. Also, the pattern may desirably provide for sufficient gaps between the outer most fragile insulation materials and the edges of the composite board. These interstices and gaps will, once filled with the foam material, provide sufficient integrity to the composite board including sufficient mechanical strength between the planar faces of the board.

Following placement of the fragile insulation materials 19 on the upper surface 18 of board 17, developing foam 25 is deposited over the upper surface 26 of fragile insulation materials 19, as well as within interstices 20 and gap(s) 22 exposed in the upper surface 18 of construction board 17.

As described above, the developing foam 25 can be provided from an A-side stream of reactants 27 and a B-side stream of reactants 29. Using conventional procedures, the developing foam can be deposited using one or more mix heads, not shown.

In one or more embodiments, sufficient developing foam 25 is deposited over the upper surface 26 of fragile insulation materials 19 to provide a layer of sufficient thickness to protect the fragile insulation materials. In one or more embodiments, this layer may be from about 0.25 inches (0.64 cm) to about 2 inches (5.08 cm), in other embodiments from about 0.375 inches (0.95 cm) to about 1 inch (2.54 cm), and in other embodiments from about 0.5 inches (1.27 cm) to about 0.75 inches (1.91 cm).

Following the step of depositing foam, a facer material 31 may be applied to the developing foam 25 in a facer application step 33 of process 11. Following application of facer 31, the pre-cured composite 34 can then be conveyed into a laminator 23, which sets the overall thickness of the finished composite 35 and wherein at least partial curing of the foam takes place. For example, within laminator 23, heat may be applied from heat source 37 to facilitate the polyurethane and/or polyisocyanurate reaction and thereby cure the polyurethane and/or polyisocyanurate material in the formation of the cellular foam product. In one or more embodiments, the surface of the composite is heated to achieve a surface temperature of from about 140 to about 180° C.

As with conventional procedures for producing polyisocyanurate construction boards, once the polyisocyanurate material leaves the laminator, the foam product (which may be referred to as a composite) can be trimmed or otherwise finished, and cut to length. In practicing the present invention, the foam product can be cut to length and, in certain embodiments, the fragile insulation material will not be cut. In other words, in one or more embodiments, the foam product will be cut to length by cutting between the interstices that may be provided between the fragile insulation materials. Several techniques can be employed to determine the location of the interstices, which may not be readily apparent due to the fact that they are encapsulated. In one or more embodiments, x-ray or other analytical techniques can be employed to locate the interstices between the fragile insulation materials. In other embodiments, the fragile insulation materials can be modified with a place marker prior to being incorporated into the process. For example, a vertically extending marker can indicate one or more edges of the fragile insulation materials, and these markers can be later used to identify the interstices and thereby provide a location for cutting the foam product to length.

Method of Encapsulation—Second Embodiment

In a second embodiment of the present invention, a process of encapsulating a fragile insulation material includes depositing a developing foam on to a facer material, positioning one or more fragile insulation materials onto the developing foam, and subsequently depositing additional developing foam over the fragile insulation material to at least partially cover the fragile insulation material and mate with the previously deposited developing foam.

Figure 3:
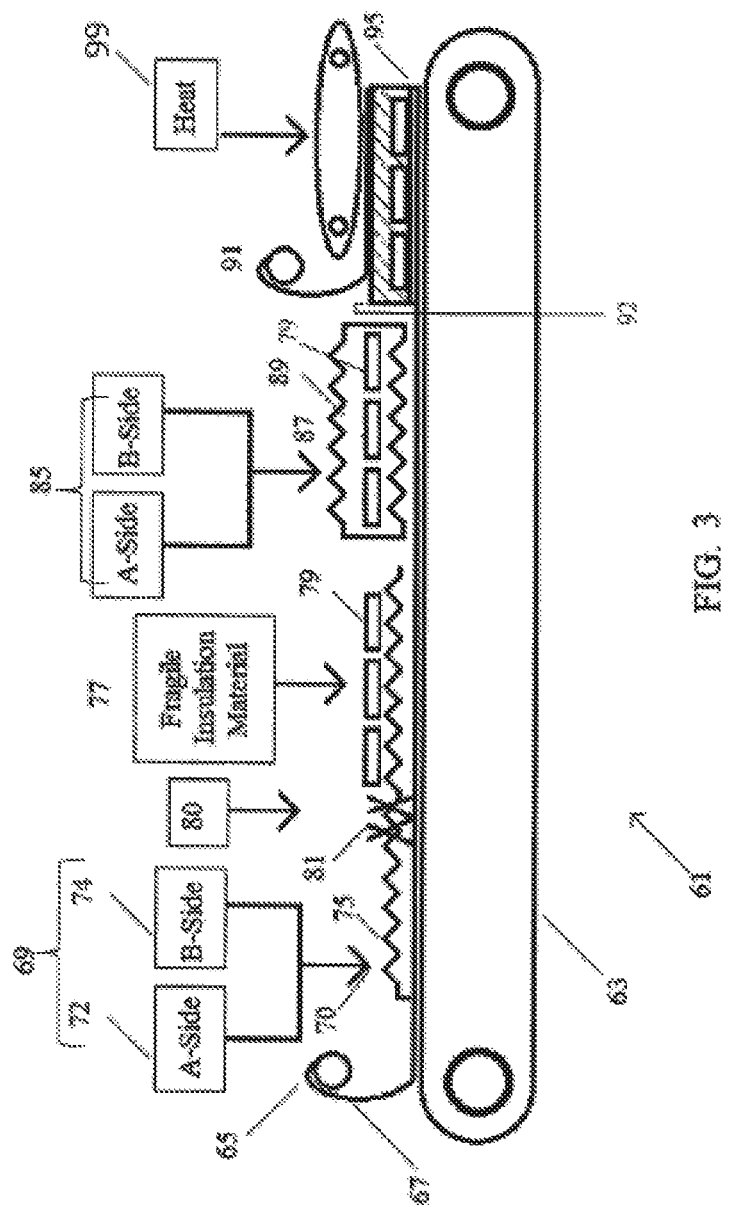
FIG. 3 is a schematical representation of a process according to embodiments of the present invention.

The process of one or more of these embodiments can be described with reference to FIG. 3, which shows continuous process 61 employing conveyer system 63. In a first step 65 of process 61, a facer 67 is positioned on conveyor 63. In a first foam depositing step 69, a developing foam 70 is deposited on facer 67 carried by conveyor 63. As with conventional procedures, layer 75 of developing foam 70 is provided by mixing an A-side stream of reactants 72 and a B-side stream of reactants 74. By depositing developing foam 70 on to a surface of facer 67, a layer 75 of developing foam 70 is formed on facer 67. In a second step 77, fragile insulation material(s) are positioned on developing foam 70. As with other embodiments of this invention, fragile insulation materials 79 are positioned on layer 75 of developing foam 70 in a desired pattern. With reference again to FIG. 2, the pattern may include interstices 20 between the respective fragile insulation materials 79 (referred to as 19 in FIG. 2). Likewise, the pattern may provide for gaps between the edge of the conveyor and the edge(s) of the outmost fragile insulation materials.

Prior to placing fragile insulation materials 79 onto layer 75 of developing foam 70, the process may include a step 80 for depositing one or more spacers 81 onto facer 67. The placement of spacers 81 onto facer 67 can take place before application of the developing foam 70 to facer 67, or in other embodiments the application of spacers 81 to facer 67 can take place after developing foam 70 is applied to facer 67. In any event, spacer(s) 81 provide a support upon which the fragile insulation materials 79 may be positioned and thereby provide sufficient spacing between facer 67 and fragile insulation materials 79.

Figure 4:
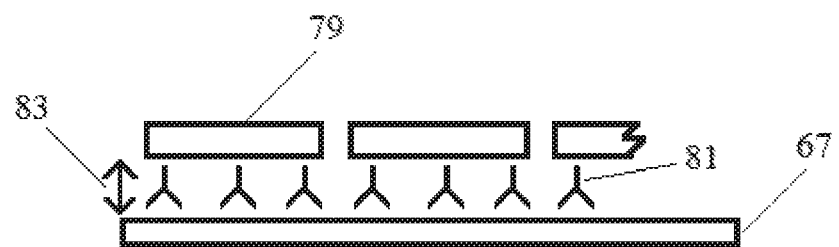
FIG. 4 is a cross-sectional, side view showing a step according to a process according to embodiments of the invention.

In one or more embodiments, the operation of spacer(s) 81 can be better described with reference to FIG. 4. As shown, spacers 81 are proximate to facer 67 and provide a support for fragile insulation materials 79 so that a sufficient space 83 exists between facer 67 and fragile insulation materials 79. In one or more embodiments, space 83 may be from about 0.25 inches (0.64 cm) to about 2 inches (5.08 cm), in other embodiments from about 0.375 inches (0.95 cm) to about 1 inch (2.54 cm), and in other embodiments from about 0.4 inches (1.02 cm) to about 0.75 inches (1.91 cm).

Practice of one or more embodiments of the present invention is not necessarily limited by the shape of the spacer. For example, the spacer may take on the form of a jack, which generally has six points or knobs projecting from a common base. Likewise, the material from which the spacer is fabricated can vary. For example, in one or more embodiments, the spacer may be fabricated from a plastic material or a thermosetting material. In one or more embodiments, spacers 81 may be adhesively secured to facer 67. In other embodiments, spacers 81 may be adhesively secured to fragile insulation materials 79. In one or more embodiments, spacers 81 may be adhesively secured to both facer 67 and fragile insulation materials 79.

In one or more embodiments, the spacer may include a fabric. These fabrics may have sufficient thickness to provide a desired gap between facer 67 and the positioning of fragile insulation materials 79. This gap may be consistent with the dimensions provided above for spacers 81. While the fabric will have sufficient density, and therefore sufficient compressive strength, to maintain the fragile insulation materials sufficiently above facer 67 to maintain the desired gap between the facer and the fragile insulation materials, the fabric is characterized by a density that allows for the adsorption of developing foam, and thereby allows the developing foam to fully encapsulate the fragile insulation materials. This step of applying the developing foam will be described in greater detail herein below.

In one or more embodiments, the spacer may be pre-attached to the facer material, in other embodiments pre-attached to the fragile insulation material, or in other embodiments to both the facer material and the fragile insulation material prior to incorporating these elements of the process of the present invention. For example, in one or more embodiments, the spacer is pre-attached to the fragile insulation material within an "off-line" step that is separate and distinct from the process of depositing the developing foam onto the fragile insulation material.

As indicated above, whether or not spacers are employed, the step 77 of positioning fragile insulation materials 79 onto layer 75 of developing foam 70 creates a desired pattern having interstices between the various fragile insulation materials 79, as well as a gap between the outer most edge of the outer most fragile insulation materials 79 and the edge of conveyor 63, which may be in the form of a trough. Once fragile insulation materials 79 are positioned on developing foam 70, a second application 85 of developing foam 87 is applied to at least partially cover fragile insulation materials 79 positioned over developing foam 70. The second step of depositing developing foam 85 may occur according to conventional procedures wherein an A-sides stream of reactants is mixed with a B-side stream of reactants within an appropriate mix head. Second step 85 of depositing a developing foam 87 creates a second layer 89 of developing foam that at least partially covers fragile insulation materials 79 and at least partially mates with first layer 75 of developing foam 70 to thereby encapsulate fragile insulation materials 79 within polyisocyanurate foam. In one or more embodiments, it may be desirable to position the mix heads to deposit foam within the interstices between the respective fragile insulation materials or near the edges of the facer.

Following second application 85 of developing foam 87, a second facer material 91 can be mated with top surface 92 of second developing foam layer 89 to form a composite structure having opposing facers 67 and 91. As with the previous embodiments, the pre-cured composite can be placed into a laminator and heated (e.g., heating step 99). The finished composite can be cut to length and/or otherwise finished.

Method of Encapsulation—Third Embodiment

In a third embodiment, the process of encapsulating a fragile insulation material includes positioning one or more spacers on a facer material, subsequently positioning one or more fragile insulation materials onto the spacers, and subsequently depositing a developing foam onto the fragile insulation materials and the facer.

The process of one or more of these embodiments can be described with reference to FIG. 5, which shows continuous process 101. Continuous process 101 employs conveyor system 103. In a first step 105, facer material 107 is positioned on an upper surface of conveyor 103.

In a subsequent step 110, spacers 109 are positioned on an upper surface 108 of facer 107. These spacers may be similar or the same as those spacers described above with respect to other embodiments. For example, and as indicated above, the spacers may include a plurality of devices such as jacks or plugs. Alternatively, the spacer may include a fabric having sufficient thickness to provide a desired gap between the facer and the fragile insulation material. Also, as indicated above, the spacer may be affixed or otherwise adhered to the fragile insulation material, to the facer, or to both the facer and the fragile insulation material. In one or more embodiments, the spacer is adhered or otherwise affixed by providing an adhesive as part of an "on-line" step integrated with other steps of the process. In other embodiments, the spacer may be pre-adhered or pre-affixed to the facer, to the fragile insulation material, or to both the facer and the fragile insulation material in an "off-line" step that is separate and distinct from the step of depositing the developing foam.

Following application of spacers 109, the next step 111 includes positioning fragile insulation materials 113 in a desired pattern over spacers 109. As with previous embodiments, the spacers serve to create a gap 115 between upper surface 108 of facer material 107 and a lower surface 114 of fragile insulation material 113. Also, the pattern in which fragile insulation materials 113 are positioned over spacers 109 may, as with previous embodiments, provides interstices between the various fragile insulation materials 113, as well as a gap between the outermost edge of the outer most fragile insulation materials 113 and the edge of conveyor 103, which may be in the form of a trough.

Once the fragile insulation materials 113 are positioned over spacers 109, a subsequent step 117 includes depositing a developing foam 119 onto fragile insulation materials 113 and facer 107. As with the previous embodiments, this developing foam 119 can be provided by the mixture of an A-side stream of reactants 121 and a B-side stream of reactants 123. This step 117 of depositing foam 119 encapsulates fragile insulation materials 113 through the mobility of developing foam 119. In other words, developing foam 119 has sufficient fluidity to contact facer 107 by passing through the interstices that exist between the various fragile insulation materials 113 and the gaps that exist between the outer edges of the fragile insulation materials and the edges of the conveyor 103.

In one or more embodiments, the process parameters are adjusted to ensure that the developing foam fully encapsulates the fragile insulation materials. In particular, adjustments are made to ensure that the developing foam flows between the interstices that exist between the panels, the gaps that exist between the edge panels and the trough walls, and the gap that exists between the bottom of the fragile insulation materials and the facer. For example, adjustments may need to be made to ensure that the developing foam flows under the fragile insulation materials. In one or more embodiments, these process parameters may include one or more of the following (i) the number of mix heads employed, (ii) the positioning of the mix heads, and (iii) the gel time of the developing foam. In one or more embodiments, the developing foam is engineered to have a gel time of at least 10 seconds, in other embodiments at least 12 seconds, in other embodiments at least 14 seconds, and in other embodiments at least 16 seconds. In these or other embodiments, the developing foam is engineered to have a gel time of less than 30 seconds, in other embodiments less than 25 seconds, and in other embodiments less than 20 seconds. As the skilled person understands, gel time generally refers to the time at which the developing foam loses appreciable mobility. The skilled person is also aware of conventional tests, such as reactivity tests, that measure gel time.

As with the other embodiments, the next step of this embodiment may include the placement of facer material 131 on top of the developing foam, and placement of the pre-cured composite into the laminator (e.g., laminator 133, which may provide heat 135). After exiting the laminator, the composite can be cut to length or otherwise finished.

Various modifications and alterations that do not depart from the scope and spirit of this invention will become apparent to those skilled in the art. This invention is not to be duly limited to the illustrative embodiments set forth herein.

What is claimed is:

1. A composite insulation board comprising:
   (i) a preformed high-density polyisocyanurate construction board having a first planar surface and a second planar surface, wherein the high-density polyisocyanurate construction board has a density of greater than 2.5 pounds per cubic foot, wherein the preformed high-density polyisocyanurate construction board has a first facer disposed on a first planar surface and a second facer disposed on a second planar surface;
   (ii) a plurality of insulation devices, wherein the insulation devices are vacuum insulation panels, and wherein the plurality of insulation devices are positioned directly on the first facer above the first planar surface of the preformed high-density polyisocyanurate construction board; and
   (iii) a polyisocyanurate insulating foam material encapsulating the plurality of insulation devices between the insulating foam and the preformed high-density polyisocyanurate construction board, wherein the insulating foam material has a density of less than 2.5 pounds per cubic foot.

2. The composite insulation board of claim 1, further comprising a facer positioned above both the plurality of insulation devices and the insulating foam material.

3. The composite insulation board of claim 1, wherein the preformed high-density polyisocyanurate construction board has a density of greater than 3.0 pounds per cubic foot.

4. The composite insulation board of claim 1, wherein the plurality of insulation devices are positioned directly on the preformed high-density polyisocyanurate construction board and interstices exist between the insulation devices.

5. The composite insulation board of claim 4, wherein the insulating foam material is positioned directly over an upper surface of the plurality of insulation devices and in the interstices between the insulation devices.

6. The composite insulation board of claim 1, wherein the insulating foam material includes a polyisocyanurate foam with an ISO index of at least 190.

7. The composite insulation board of claim 1, wherein the plurality of insulation devices are adhered to the preformed high-density polyisocyanurate construction board.

8. The composite insulation board of claim 1, wherein the insulating foam material has a density of less than 2.0 pounds per cubic foot.

* * * * *